US010428678B2

(12) United States Patent
Todorovic

(10) Patent No.: US 10,428,678 B2
(45) Date of Patent: Oct. 1, 2019

(54) DEVICE OF A TURBOMACHINE FOR ACTUATING A SETTING DEVICE AND TURBOMACHINE WITH SUCH A DEVICE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 111 days.

(21) Appl. No.: 15/673,102

(22) Filed: Aug. 9, 2017

(65) Prior Publication Data
US 2018/0045069 A1   Feb. 15, 2018

(30) Foreign Application Priority Data
Aug. 11, 2016  (DE) .................. 10 2016 114 930

(51) Int. Cl.
 *F01D 17/14*  (2006.01)
 *F16H 19/04*  (2006.01)
 *F16H 21/44*  (2006.01)
 *F16H 33/20*  (2006.01)
(Continued)

(52) U.S. Cl.
 CPC .......... *F01D 17/141* (2013.01); *F01D 17/10* (2013.01); *F01D 17/20* (2013.01); *F16H 19/04* (2013.01);
(Continued)

(58) Field of Classification Search
 CPC ........ F01D 17/141; F01D 17/20; F01D 17/10; F01D 11/24; F16H 21/44; F16H 19/04;
(Continued)

(56) References Cited

U.S. PATENT DOCUMENTS 767,250 A   8/1904  Schneider
2,782,001 A   2/1957  Charles et al.
(Continued)

FOREIGN PATENT DOCUMENTS

DE        693228       8/1904
DE     267508 C       2/1911
(Continued)

OTHER PUBLICATIONS

German Search Report dated May 4, 2017 for counterpart German Application No. DE 10 2016 114 930.6.
(Continued)

*Primary Examiner* — Ian G Paquette
(74) *Attorney, Agent, or Firm* — Shuttleworth & Ingersoll, PLC; Timothy J. Klima

(57) ABSTRACT

A device of a turbomachine actuates a setting device to vary a flow cross-section of a flow channel of the turbomachine passable by a fluid flow. The device includes a displacement mechanism having an adjustable actuation appliance and couplable with the setting device, and a drive device for displacing the actuation appliance. The displacement mechanism has a centrifugal force appliance displaceable between a basic position and a maximally displaced working position depending on a number of revolutions of the drive device, wherein the actuation appliance is displaceable depending on the position of the centrifugal force appliance with respect to the drive device. A reset device applies a force to the centrifugal force appliance by which the centrifugal force appliance is pressed in the direction of its basic position.

17 Claims, 3 Drawing Sheets

(51) Int. Cl.
*F16K 31/54* (2006.01)
*G01D 5/22* (2006.01)
*F01D 17/10* (2006.01)
*F01D 17/20* (2006.01)
*F16K 1/20* (2006.01)
*F01D 11/24* (2006.01)

(52) U.S. Cl.
CPC ............ *F16H 21/44* (2013.01); *F16H 33/20* (2013.01); *F16K 31/54* (2013.01); *G01D 5/2291* (2013.01); *F01D 11/24* (2013.01); *F05D 2220/323* (2013.01); *F05D 2260/52* (2013.01); *F05D 2260/57* (2013.01); *F05D 2270/66* (2013.01); *F16K 1/2007* (2013.01); *Y02T 50/671* (2013.01)

(58) Field of Classification Search
CPC .... F16H 33/20; F16H 25/20; F16H 2019/046; F16H 37/12; G01D 5/2291; Y02T 50/671; F05D 2270/66; F05D 2260/52; F05D 2260/57; F05D 2220/323; F16K 1/2007; F16K 1/16; F16K 31/043; F16K 31/508; F16K 31/52; F16K 31/53; F16K 31/54
See application file for complete search history.

(56) References Cited

U.S. PATENT DOCUMENTS

| 8,834,108 | B2 | 9/2014 | Negulescu et al. |
| 9,845,859 | B2* | 12/2017 | Pate ................... F16H 19/04 |
| 2006/0017032 | A1* | 1/2006 | DeWall ............... F16K 31/046 251/129.11 |
| 2011/0041632 | A1* | 2/2011 | Baker .................. B64C 13/28 74/89.23 |

FOREIGN PATENT DOCUMENTS

| DE | 263107 C | 8/1912 |
| DE | 267508 C | 11/1913 |
| DE | 102009010647 A1 | 9/2010 |
| DE | 102014217833 A1 | 3/2016 |
| GB | 836580 A | 6/1960 |

OTHER PUBLICATIONS

European Search Report dated Dec. 19, 2017 for counterpart European Application No. 17185263.5.

* cited by examiner

DEVICE OF A TURBOMACHINE FOR ACTUATING A SETTING DEVICE AND TURBOMACHINE WITH SUCH A DEVICE

This application claims priority to German Patent Application DE102016114930.6 filed Aug. 11, 2016, the entirety of which is incorporated by reference herein.

The invention relates to a device of a turbomachine for actuating a setting device by which a flow cross-section of a flow channel of the turbomachine passable by a fluid flow may be varied or adjusted, as disclosed herein. Further, the invention relates to a turbomachine having such a device.

What is for example known from DE 10 2009 010 647 A1 is an aircraft engine with a pass gap adjustment system, wherein, for the purpose of adjusting a pass gap between a housing and the tips of turbine rotor blades, cooling air is extracted from a by-pass channel via an inlet nozzle and the airflow can be supplied to a cooling air distributor via a channel. The channel has a control valve via which an air volume flowing through the channel can be adjusted. The control valve can be actuated via a motor that is controlled by a control system.

It is known from practice to embody the motor as an electric motor, wherein the control valve can be displaced through a rotation of the electric motor about an axis into a first direction from a position in which the channel is closed into a position where the channel is at least partially opened. In a drive movement of the electric motor that runs counter to that, the control valve is displaced from a position in which the channel is at least partially opened into the direction of the position in which the channel is closed.

An actuation of the control valve by means of an electric motor that is embodied in this way has the disadvantage that, for example in the event that the power supply of the electric motors fails, the control valve remains in its current position and can not be displaced into the desired, for example closed, position.

It is further known to actuate the control valve pneumatically by means of a supply with compressor air. In such an embodiment it is ensured through a reset device that the control valve is moved into a desired position in a state in which it is not supplied with compressed air. However, due to the conduits that are needed for guiding compressor air, also including pressure reduction and/or control stages, such a solution leads to a high weight as well as high costs, and thus compromises a level of efficiency of the aircraft engine through the extraction of compressor air. In addition, a continuous readjustment of a position of the control valve is necessary as a result of pressure fluctuations of the compressor air, and a precise adjustment of a desired position of the control valve is not possible to the desired degree. Also, the operating temperature of the control valve can be increased in an undesirable manner through a leakage of hot compressor air and may have a negative impact on a temperature of the cooling air that is conducted through the channel in consequence of hot compressor air entering the channel.

In further known embodiments, the control valve can be adjusted through an actuation by means of fuel, wherein such embodiments also comprise conduits through which the costs and the weight are increased. In addition, there is the danger that the fuel is ignited during contact with hot housing parts at high operating temperatures of the control valve.

It is the objective of the present invention to create a device with a precisely adjustable actuation appliance that is embodied in a cost-effective and weight-optimized manner, wherein in the event of a failure of the drive device the actuation appliance can be displaced into a desired position in a simple manner. Further, it is the objective of the present invention to create a turbomachine that can be operated safely and can be realized in a cost-effective as well as weight-optimized manner.

This objective is achieved through a device and through a turbomachine including features as disclosed herein.

What is provided is a device of a continuous-flow machine, in particular of a turbomachine or an aircraft engine, for actuating a setting device by means of which a flow cross-section of a flow channel of the turbomachine passable by a fluid flow, which may for example be present in the gaseous phase or the liquid phase, can be varied, wherein the device is embodied with a displacement mechanism which in particular has a substantially translationally adjustable actuation appliance and which be coupled with the setting device, as well as with a drive device for displacing the actuation appliance.

According to the invention, the displacement mechanism has a centrifugal force appliance that can be displaced between a basic position and a maximally displaced working position depending on a rotational speed of the drive device, wherein the actuation appliance can in particular be displaced in a substantially translational manner with respect to the drive device depending on the position of the centrifugal force appliance, and wherein a reset device is provided that is embodied for impinging the centrifugal force appliance with a force that presses the centrifugal force appliance in the direction of its basic position.

The device according to the invention can advantageously be embodied in a weight and cost-effective manner, since for displacing the actuation appliance no conduits for guiding a fluid are to be provided for actuating the setting device in the turbomachine. Further, the actuation appliance can be positioned particularly precisely in a constructionally simple manner by means of the centrifugal force appliance based on the selection of the drive speed of the drive device, wherein it is ensured in a simple manner by means of the reset device that the actuation appliance takes a desired position in the event that a power failure occurs in the drive device. For example, it can be provided that, in the event of fire and a failure of the drive device, the flow channel is closed in a reliable manner through a corresponding actuation of the setting device by means of the actuation appliance.

In a device according to the invention that is embodied in a constructionally simple manner, the centrifugal force appliance is mounted in a first area in an axially fixated and rotatable manner with respect to the actuation appliance, and mounted in a second area in an axially displaceable and rotatable manner with respect to the actuation appliance, wherein the first area and the second area of the centrifugal force appliance are connected to each other via at least one connecting appliance that has at least two levers. Here, a first lever of the connecting appliance is in particular connected in an articulated manner to the first area of the centrifugal force appliance, wherein a second lever of the connecting appliance is connected in particular in an articulated manner to the second area of the centrifugal force appliance. In addition, the first lever and the second lever are connected to each other in particular in an articulated manner. With such an embodiment of the centrifugal force appliance, it can be achieved that a large force can be applied to the actuation appliance while the energy consumption of the drive device is kept low. If the centrifugal force appliance is set into a rotational movement by the drive device, the levers are moved radially outward with the connecting joint with respect to the actuation appliance, wherein a distance of the first area to the second area in the extension direction of the actuation appliance is reduced in this manner. In particular in the connection area of the levers, the first lever and/or the second lever can have a structural component with a desired weight increasing the centrifugal force and supporting the outward displacement of the connecting joint of the levers.

In an advantageous embodiment of the invention, the centrifugal force appliance is embodied with two connecting appliances that respectively have two levers, so that the centrifugal force appliance represents a so-called governor mechanism.

A constructionally simple embodiment of the device according to the invention is created if the reset device is embodied as a spring appliance.

In an advantageous further development of the invention, the spring appliance is embodied for acting together with the first area as well as with the second area of the centrifugal force appliance, and applies a force to them by which the areas are pressed apart, for example.

The drive device is preferably embodied as an electric motor, in particular as a stepper motor.

In order to be able to drive the centrifugal force appliance in a simple manner, the drive device is connected to the areas of the centrifugal force appliance in a torque-proof manner in an advantageous embodiment of the invention.

In a constructionally simple embodiment of the device according to the invention, the drive device has a drive shaft that is embodied as a hollow shaft that is connected to the area of the centrifugal force appliance in a torque-proof manner and circumferentially surrounds the actuation appliance at least in the area of the centrifugal force appliance.

The actuation appliance can be embodied in a shaft-like manner at least in certain sections, wherein the actuation appliance acts together with the centrifugal force appliance in particular in the shaft-like area.

In an advantageous embodiment of the invention, a sensor appliance for determining an axial position of the actuation appliance is provided, wherein for a particularly precise measurement of the position of the actuation appliance the sensor appliance can preferably be embodied as a differential transformer, for example as a so-called linear variable differential transducer (LVDT).

In order to be able to adjust a position of the actuation appliance in a particularly precise manner according to a specification, a control appliance embodied for actuating the drive device can be provided, wherein the control appliance is connected with the sensor appliance and is embodied for actuating the drive device based on a comparison of a predefined position of the actuation appliance to a position of the actuation appliance as determined by the sensor appliance.

To realize a constructionally simple linking of the actuation appliance to the setting device, it is possible to provide a lever mechanism which is coupled to the actuation appliance and by means of which the displacement mechanism can be coupled with the setting device.

What can be provided as an alternative to that is a rack and pinion drive which is coupled to the actuation appliance and by means of which the displacement mechanism can be coupled with the setting device.

In its totality, the device can be arranged inside a sealed-off area in a simple manner. This is in particular advantageous in the case that the device is used in rough ambient conditions that may lead to a strong wear and tear, damage or blocking of the device. Thus, the device can be operated safely even in such conditions.

What is further proposed is a turbomachine with a flow channel having a flow cross-section through which a fluid can flow, wherein a setting device is provided, by means of which a flow cross-section of the flow channel that is passable by the flow may be varied or adjusted, wherein the setting device is adjusted by means of a device as it is described more closely above.

The turbomachine according to the invention can advantageously be realized in a weight-optimized and cost-effective manner, as no conduits conveying a working fluid for actuating the setting device have to be provided in the turbomachine for displacing the actuation appliance. At that, it can be ensured in a simple manner by means of the reset device that the actuation appliance is displaced into a desired position, for example into a position in which the flow channel is closed, in the event of a failure of the drive device, for example in the event that a fire or a power failure occurs. In addition, the actuation appliance can be positioned in a particularly precise and constructionally simple manner by means of the centrifugal force appliance.

In principle, the device according to the invention can be used in the area of all flow channels of a turbomachine that conduct gaseous and/or liquid fluid, in particular of a turbomachine that is embodied as an aircraft engine, wherein the respective flow channel has a setting device by means of which a flow cross-section of the flow channel through which the fluid can flow may be varied in the area of the setting device. At that, the flow cross-section can in particular be completely closed and/or almost completely opened by means of the setting device, which may for example be embodied as a control valve or as a pivoted flap. For example, in the event of fire or a drop in performance, the setting device can be displaced in a safe manner by means of the reset device into a position in which the flow cross-section is opened or into a position in which the flow cross-section is closed, depending on the application case.

The device according to the invention can in particular be used for actuating a control valve or a flap of a turbine pass gap control system in which cooling air extracted from a by-pass channel can be guided in the direction of a turbine housing and turbine wheels via a flow channel that comprises the setting device.

Further, the device according to the invention can be provided in the area of an environmental control system, a system for cooling a turbine and/or bearings or for actuating a fuel shut-off valve.

Other advantages and advantageous embodiments of the device according to the invention or the turbomachine according to the invention follow from the patent claims and the exemplary embodiments that will be described in principle by referring to the drawing, wherein, with a view to clarity, the same reference signs are used in the description of the different exemplary embodiments for structural components having the same design and functions.

Herein:

Figure 4:
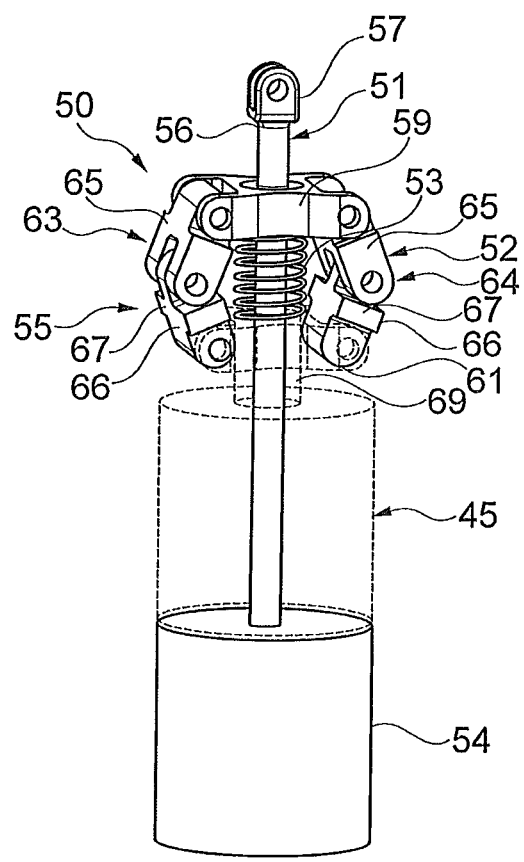
FIG. 4 shows a simplified three-dimensional rendering of the device according to FIG. 2 and FIG. 3 in isolation.
Figure 5:
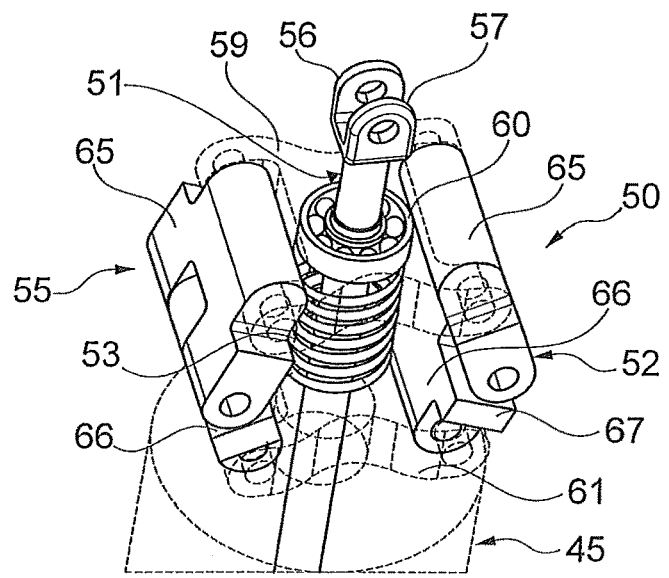
FIG. 5 shows a simplified three-dimensional rendering of a section of the device according to FIG. 4.
Figure 6:
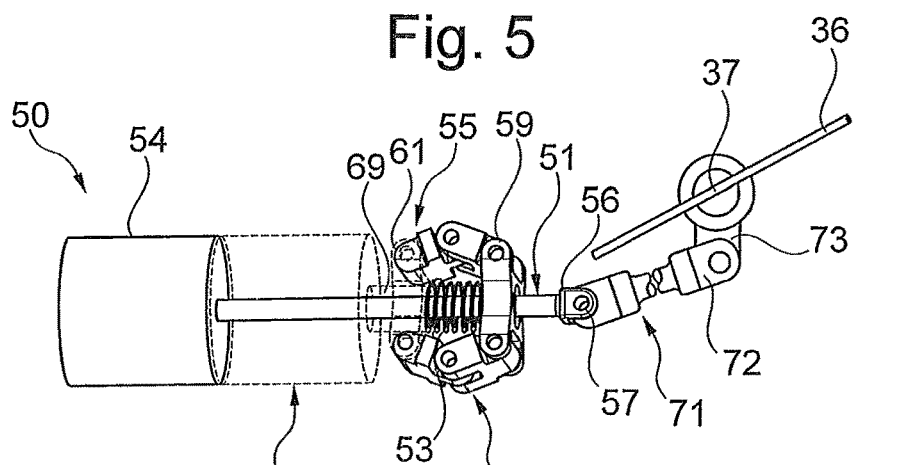
Figure 7:
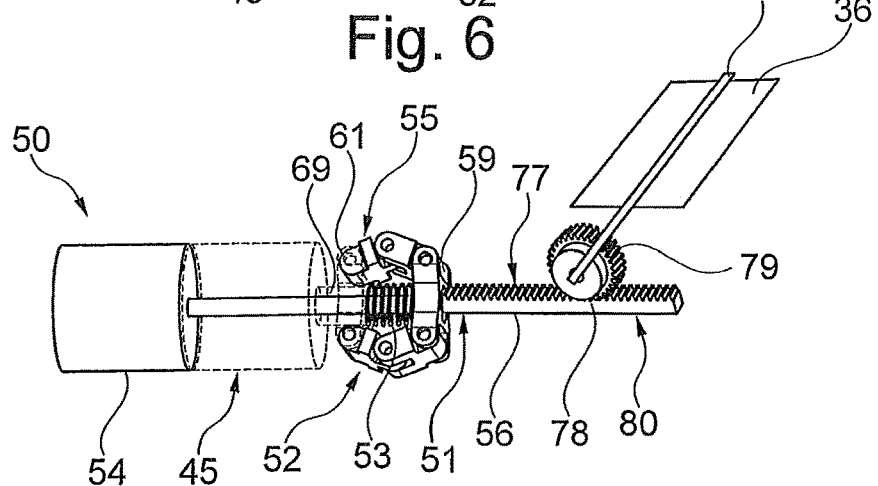

FIG. 6 shows a strongly simplified rendering of a section of the aircraft engine according to FIG. 1 to FIG. 5, wherein a linking appliance can be seen, by means of which the setting device can be actuated by the device; and FIG. 7 shows a simplified rendering of the section of the aircraft engine according to FIG. 6, wherein an alternative embodiment of a linking appliance for coupling the device with the setting device is shown.

Figure 1:
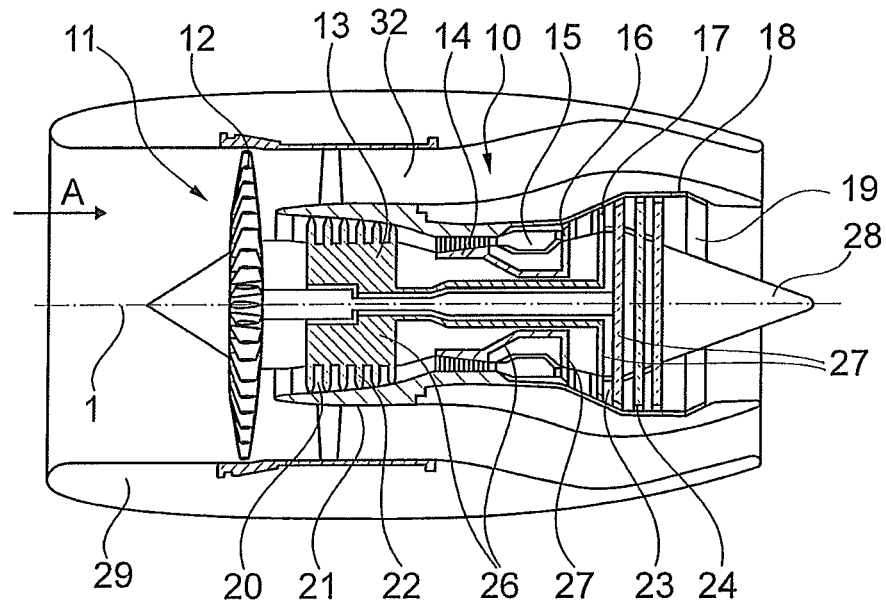
FIG. 1 shows a longitudinal section of an aircraft engine in a strongly schematized manner.

FIG. 1 shows a turbomachine that is embodied as an aircraft engine 10 or a turbine engine 10. The aircraft engine 10 is embodied in a conventional manner and comprises, arranged successively in flow direction A, an air inlet 11, a fan 12 that rotates inside a housing, an intermediate-pressure compressor 13, a high-pressure compressor 14, combustion chambers 15, a high-pressure turbine 16, an intermediate-pressure turbine 17, and a low-pressure turbine 18 as well as an exhaust nozzle 19, which are all arranged around a central engine axis 1.

The intermediate-pressure compressor 13 and the high-pressure compressor 14 respectively comprise multiple stages, of which each has an arrangement of fixedly arranged stationary guide vanes 20 extending in the circumferential direction that are generally referred to as stator vanes and project radially inward from the engine housing 21 through the compressors 13, 14 into a ring-shaped flow channel. Further, the compressors have an arrangement of compressor rotor blades 22 that project radially outward from a rotatable drum or disc 26, and are coupled to hubs 27 of the high-pressure turbine 16 or the intermediate-pressure turbine 17.

The turbine sections 16, 17, 18 have similar stages, comprising an arrangement of stationary guide vanes 23 projecting radially inward from the housing 21 through the turbines 16, 17, 18 into the ring-shaped flow channel, and a subsequent arrangement of turbine blades/vanes 24 projecting outwards from the rotatable hub 27. During operation, the compressor drum or compressor disc 26 and the blades 22 arranged thereon as well as the turbine rotor hub 27 and the turbine rotor blades/vanes 24 arranged thereon rotate around the engine axis 1. The reference sign 28 shows an outlet cone.

Figure 2:
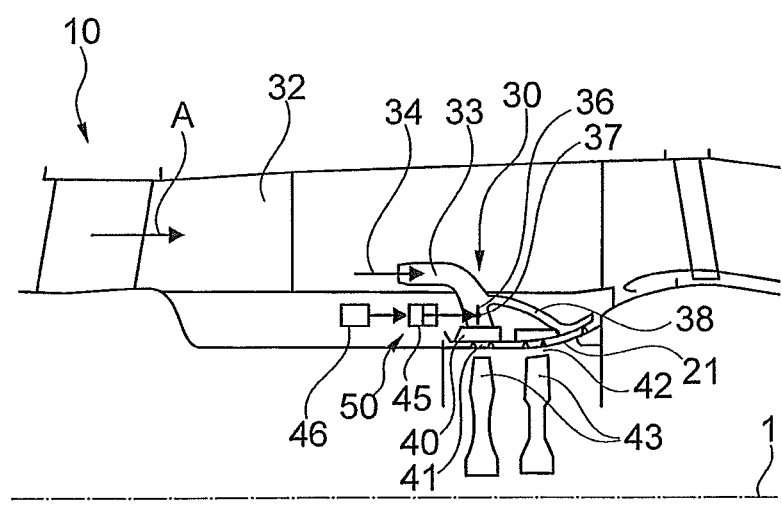
FIG. 2 shows, in a simplified manner, a section of the aircraft engine according to FIG. 1, wherein a pass gap adjustment system with a device by means of which a setting device can be actuated can be seen in more detail.

The section of the aircraft engine 10 according to FIG. 2 shows an active pass gap adjustment system 30, by means of which a pass gap between the coatings at a radially inner surface of the turbine housing 21 and the turbine rotor blade tips 43 can be influenced through an exterior cooling of the engine housing 21 or the turbine housing, wherein thermal expansions of the turbine housing 21 as well as radial expansions of the turbine rotors and blades 24 are taken into account.

The pass gap adjustment system 30 has an inlet nozzle 33 that forms an air inlet and is arranged inside a by-pass channel 32 of the aircraft engine 10 at least in certain areas. An airflow 34 entering through the inlet nozzle 33 is guided radially inward through a flow channel 35, wherein a setting device is arranged inside the flow channel 35, being embodied as a control valve 36 or as a flap that is pivoted about an axis 37 by means of which a flow cross-section of the flow channel 35 that can be passed by a flow may be varied or adjusted. In the present case, a further flow channel 38, by means of which cooling air can be conducted in an uncontrolled manner, branches off from the flow channel 35 upstream of the flap 36.

In the rendering according to FIG. 2, the flap 36 is shown in a position that opens the flow channel 35 almost completely, wherein the flap 36 can be pivoted about the axis 37 from the shown position into a position in which the flow channel 35 is in particular completely closed.

Downstream of the flap 36, cooling air that flows through the flow channel 35 is supplied to the cooling air distributor 40 that is arranged adjacent to the turbine housing 21, so that the cooling air can be directed onto a wall of the turbine housing 21 through impingement cooling nozzles or a punched hole 41. By means of this cooling air conduction, a pass gap 42 between the turbine housing 21 and the turbine blade tips 43 can be adjusted to a desired degree.

A drive device 45 of a device 50, which can be actuated by a control appliance 46, is provided for displacing the flap 36 between the position in which the flow channel 35 is closed and the position in which the flow channel 35 is almost completely opened.

Figure 3:
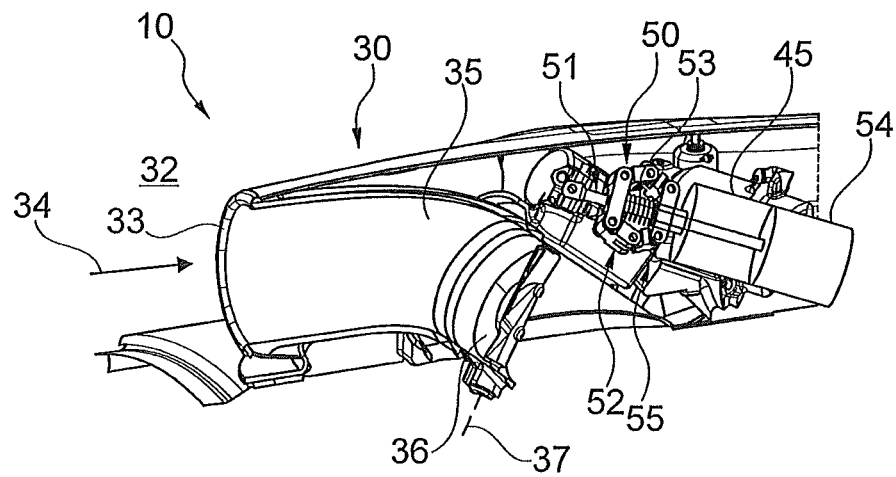
FIG. 3 shows, in a strongly simplified manner, a three-dimensional view of the pass gap adjustment system according to FIG. 2 with the device.

FIG. 3 shows the device 50 for actuating the flap 36 in a strongly schematized manner, wherein there is no further flow channel branching off upstream of the flap 36 in the embodiment according to FIG. 3.

The device 50 that is shown in isolation in FIG. 4 and FIG. 5 has a displacement mechanism 55 which in the present case is embodied with an actuation appliance 51, a centrifugal force appliance 52, and a reset device 53 in addition to the drive device which is embodied as an electric motor 45, and for example as a stepper motor. In addition, the device 50 also has a sensor appliance 54.

At that, the actuation appliance 51 is embodied as a shaft and has, in a first end area 56, a coupling appliance 57 via which the actuation appliance 51 can be linked to the flap 36. The centrifugal force appliance 52 comprises a first area 59, in which the centrifugal force appliance 52 is axially fixated and mounted in a rotatable manner with respect to the actuation appliance 51 by means of a bearing appliance 60 that can be seen in more detail in FIG. 5. The centrifugal force appliance 52 further has a second area 61 that is arranged at side of the first area 59 that is facing away from the coupling appliance 57, wherein the centrifugal force appliance 52 is mounted in a rotatable and axially displaceable manner with respect to the actuation appliance 51 in the second area 61, so that a distance between the first area 59 and the second area 61 of the centrifugal force appliance 52 can be varied in the longitudinal direction of the actuation appliance 51.

In the present case, the first area 59 and the second area 61 of the centrifugal force appliance 52 are connected to each other via two connecting appliances 63, 64 that are arranged at opposite sides of the actuation appliance 51, wherein the connecting appliances 63, 64 respectively have a first lever 65 linked in an articulated manner to the first area 59, and a second lever 66 linked in an articulated manner to the second area 61. In addition, the levers 65 and 66 of a connecting appliance 63 or 64 are respectively connected to each other in an articulated manner in areas that are facing away from the first area 59 or the second area 61, wherein in the present case the second levers 66 have a weight-increasing area 67. In the present case, the centrifugal force appliance 52 is a so-called governor mechanism.

In the present case, the reset device 53 is embodied as a coil spring appliance that circumferentially surrounds the actuation appliance 51 with its windings. On the one hand, the coil spring appliance 53 is connected to the first area 59 of the centrifugal force appliance 52 and, on the other hand, to the second area 61 of the centrifugal force appliance, and exerts a force on the areas 59, 61 by which the areas 59, 61 are pressed apart. In a position of the areas 59, 61 in which they are maximally moved apart, the flap 36 is in the position in which the flow channel 35 is closed. Thus, the flap 36 is moved into this position in the unactuated state of the drive device 45.

The drive device, which is embodied as an electric motor 45, for example in the kind of a stepper motor, has a drive shaft that is embodied as a hollow shaft 69, which surrounds the shaft-like actuation appliance 51 on a side of the second area 61 of the centrifugal force appliance 51 that is facing away from the first area 59 of the centrifugal force appliance 51. Here, the hollow shaft 69 is connected in a torque-proof manner to the second area 61 of the centrifugal force appliance 52, so that a rotational movement of the drive shaft 69 has a direct effect on the centrifugal force appliance 52 and the latter rotates together with the drive shaft 69 about the actuation appliance 51.

Apart from the drive shaft 69, in the present case the entire electric motor 45 surrounds the actuation appliance 51 that extends through the entire electric motor 45 in the longitudinal direction of the actuation appliance 51 up to the sensor appliance 54. Here, the sensor appliance 54 adjoins the electric motor 45 on a side that is facing away from the second area 61 of the centrifugal force appliance 52. By means of the sensor appliance, which is for example embodied as a linear variable differential transformer 54, the position of the actuation appliance 51 with respect to the longitudinal direction of the actuation appliance 51 can be precisely determined.

FIG. 6 shows, in a simplified manner, a linking appliance 71 by means of which the actuation appliance 51 is coupled to the flap 36. Here, the linking appliance 71 has a lever 72 that is liked in an articulated manner to the coupling appliance 57 of the actuation appliance 51, and linked in an articulated manner to an arm 73 that is fixedly connected to the flap 36. The flap 36 can be pivoted about an axis 37 by means of an in particular translational displacement movement of the actuation appliance 51.

A linking appliance 77 that is embodied in an alternative manner is shown in FIG. 7, wherein in this case the actuation appliance 51 is coupled to the flap 36 by means of a rack and pinion drive 80. For this purpose, on a side of the first area 59 that is facing away from the second area 61 of the centrifugal force appliance 52, the actuation appliance 51 is fixedly connected to a rack area 78 of the rack and pinion drive 80 that combs with a gear wheel 79 of the rack and pinion drive 80 which is mounted so as to be rotatable about the axis 37. The gear wheel 79 is fixedly connected to the flap 36, so that a substantially translational displacement of the actuation appliance 51 leads to the flap 36 being pivoted about the axis 37.

If the flap 36 is to be displaced from its closed position into a position in which the flow channel 35 is at least partially opened, the control appliance 46 controls the electric motor 45 in such a manner that the hollow shaft 69 rotates about the actuation appliance 51. Depending on the rotational speed of the hollow shaft 69, a connection point of the levers 65, 66 of the connecting appliances 63, 64 pivots with respect to the actuation appliance 51 in the area of a connection point of the levers 65 and 66 starting from a basic position, in which no operating torque is being supplied by the electric motor 45, outward into a working position, whereby the first area 59 of the centrifugal force appliance 52 is moved against the spring force of the spring appliance 53 in the direction of the second area 61 of the centrifugal force appliance 52 depending on the rotational speed of the centrifugal force appliance 52. As a result, the actuation appliance 51 is also moved with its first end area 56 in the direction of the second area 61 of the centrifugal force appliance 52 in a substantially translational manner due to its axial fixation by means of the bearing appliance 60 in the first area 59 of the centrifugal force appliance 52, wherein the flap 36 is displaced about the axis 37 through the corresponding linking appliance 71 or 77.

In the course of this process, the control appliance 46 that is coupled to the sensor appliance 54 continuously monitors an actual position of the actuation appliance 51 with respect to a set position, and actuates the electric motor 45 to the desired degree in the event that a discrepancy is present.

Apart from the described application case, the device according to the invention 50 can in principle be provided for actuating all setting devices by means of which a flow cross-section of a turbomachine 10 passable by a flow may be adjusted.

PARTS LIST 1 engine axis
10 turbomachine; aircraft engine
11 air inlet
12 fan
13 intermediate-pressure compressor
14 high-pressure compressor
15 combustion chamber
16 high-pressure turbine
17 intermediate-pressure turbine
18 low-pressure turbine
19 exhaust nozzle
20 guide vanes
21 engine housing
22 compressor rotor blades
23 guide vanes
24 turbine blades
26 disc
27 hub
28 outlet cone
30 pass gap adjustment system
32 by-pass channel
33 inlet nozzle
34 airflow
35 flow channel
36 setting device; control valve; flap
37 axis
38 further flow channel
40 cooling air distributor
41 punched hole
42 pass gap
43 turbine blade tips
45 drive device; electric motor
46 control appliance
50 device
51 actuation appliance
52 centrifugal force appliance
53 reset device; spring appliance
54 sensor appliance
55 displacement mechanism
56 first end area of the actuation appliance
57 coupling appliance
59 first area of the centrifugal force appliance
60 bearing appliance
61 second area of the centrifugal force appliance
63 connecting appliance
64 connecting appliance
65 first lever of the connecting appliances
66 second lever of the connecting appliances
67 area of the second lever 69 drive shaft; hollow shaft
71 linking appliance
72 lever
73 arm
77 linking appliance
78 rack area of the actuation appliance
79 gear wheel
80 rack and pinion drive
A direction of inflow

The invention claimed is:

1. A device for actuating a setting device for varying a flow cross-section of a flow channel of a turbomachine, comprising:
   a displacement mechanism including a centrifugal force appliance and an adjustable actuation appliance that is connected between the centrifugal force appliance and the setting device,
   a drive device including a rotational portion operatively connected to the centrifugal force appliance for rotationally driving the centrifugal force appliance at a rotational speed independently of a rotational speed of the turbomachine,
   wherein the centrifugal force appliance is displaceable between a basic position and a maximally displaced working position depending on the rotational speed of the rotational portion,
   wherein displacement of the centrifugal force appliance causes displacement of the actuation appliance and the setting device,
   a reset device configured to apply a biasing force to the centrifugal force appliance, by which the centrifugal force appliance is biased in a direction of the basic position,
   wherein the biasing force causes the centrifugal force appliance to return to the basic position upon a failure of the drive device and thereby move the setting device to a safe position corresponding to the basic position.

2. The device according to claim 1, and further comprising a lever mechanism coupled between the actuation appliance and the setting device.

3. The device according to claim 1, and further comprising a rack and pinion drive coupled between the actuation appliance and the setting device.

4. A turbomachine with a flow channel having a flow cross-section through which a fluid can flow, comprising:
   the device and setting device according to claim 1.

5. The device according to claim 1, wherein the drive device includes an electric motor.

6. The device according to claim 1, and further comprising a sensor appliance for determining an axial position of the actuation appliances.

7. The device according to claim 6, wherein the sensor appliance includes a linear variable differential transformer.

8. The device according to claim 6, and further comprising a control appliance configured for actuating the drive device, wherein the control appliance is connected to the sensor appliance and configured for actuating the drive device based on a comparison of a predefined position of the actuation appliance to a position of the actuation appliance as determined by the sensor appliance.

9. The device according to claim 1, wherein the centrifugal force appliance is mounted to be axially fixated and rotatable with respect to the actuation appliance in a first area, and to be axially displaceable and rotatable with respect to the actuation appliance in a second area, wherein the first area and the second area are connected to each other by at least one connecting appliance that includes two levers.

10. The device according to claim 9, wherein the at least one connecting appliance includes two connecting appliances that each include two levers.

11. The device according to claim 10, wherein the reset device includes a spring.

12. The device according to claim 11, wherein the spring acts on both the first area and the second area of the centrifugal force appliance.

13. The device according to claim 12, wherein the drive device includes an electric motor.

14. The device according to claim 13, wherein the drive device is connected to at least one chosen from the first area and the second area in a torque-proof manner.

15. The device according to claim 14, wherein the rotational portion includes a drive shaft that is embodied as a hollow shaft and that is connected to the at least one chosen from the first area and the second area in the torque-proof manner and circumferentially surrounds the actuation appliance at least in an area of the centrifugal force appliance.

16. The device according to claim 15, wherein the actuation appliance includes a shaft, at least in certain sections.

17. The device according to claim 16, wherein the setting element includes a control valve.

* * * * *